Oct. 11, 1932.  M. F. BROGAN  1,882,061
TRIMMING MACHINE
Filed June 12, 1929
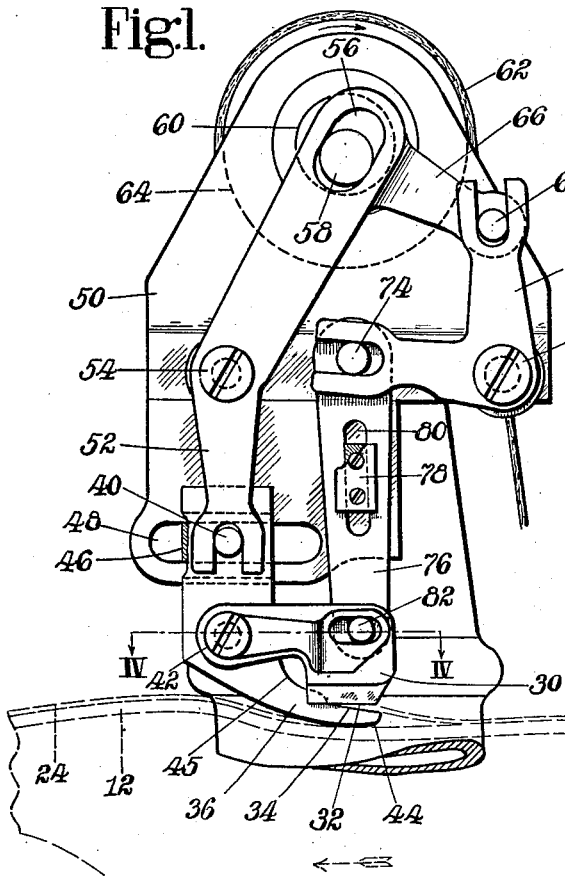
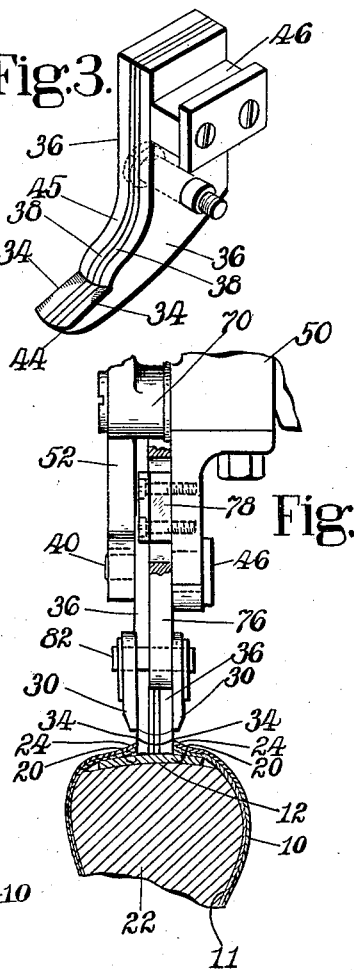
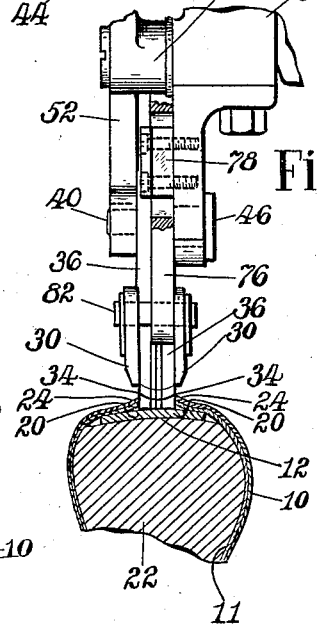
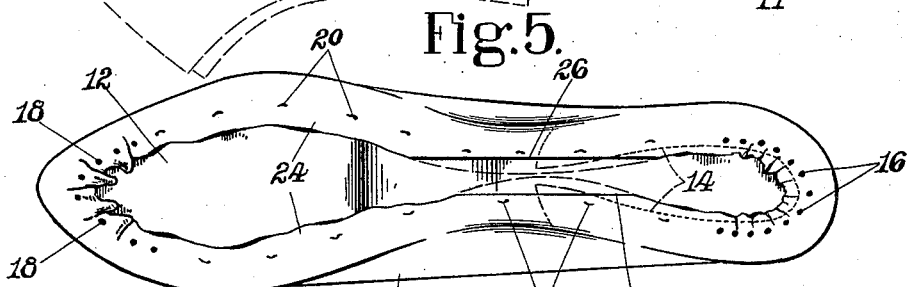
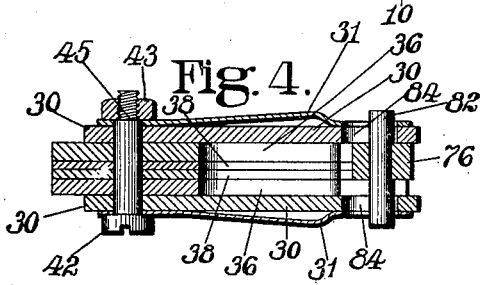
INVENTOR.
Michael F. Brogan
By his Attorney,
Nelson W. Howard Patented Oct. 11, 1932

1,882,061

UNITED STATES PATENT OFFICE

MICHAEL F. BROGAN, OF LAWRENCE, MASSACHUSETTS, ASSIGNOR TO UNITED SHOE MACHINERY CORPORATION, OF PATERSON, NEW JERSEY, A CORPORATION OF NEW JERSEY

TRIMMING MACHINE

Application filed June 12, 1929. Serial No. 370,193.

This invention relates to methods of and apparatus for cutting sheet materials, and is herein disclosed as developed with a view to trimming surplus material from the overdrawn margins of upper material that lie on or over the insole of a lasted shoe.

Certain types of shoes are made with insoles that have smooth flat bottoms as distinguished from those that have stitch-receiving ribs, feathers or shoulders. With regard to shoes made with insoles of the smooth flat type the overdrawn margins of upper material lie on the bottoms of the insoles and are commonly secured thereto by a series of fasteners so that the surplus material, if there be any, of said margins lies in confronting relation to the insoles.

When, as in the example herein illustrated, the uppers are cut to provide a sufficient amount of material to be grasped by the grippers of a side-lasting apparatus, the overdrawn margins of the uppers oftentimes extend so closely toward each other in the shank portions of the shoes that there is not sufficient space between their edges to receive shank-stiffeners. Accordingly, it has been common practice to trim these overdrawn margins one at a time in the shank portions of the shoes to provide spaces between the trimmed edges of said margins wide enough to enable shank-stiffeners to lie between them.

When, as heretofore, these margins are trimmed one at a time production is not so rapid as it might be if both margins were trimmed at once. Moreover, all former machines for performing an operation of this kind have required turning each shoe end for end after trimming the first margin and before trimming the second. Again, no former machine for such a purpose has had any provision for insuring that the trimmed edges of each pair of margins shall be straight or parallel or the desired distance apart. On the contrary, all such trimming has heretofore been dependent upon the skill and judgment of the operators with regard to the relation of the lines along which the trimming progresses.

In view of the conditions above set forth an object of the present invention is to provide an improved method and improved apparatus by which opposite margins lying in a common plane may be trimmed simultaneously, to the end that a channel of a predetermined width may be formed in one operation between the trimmed edges of the margins.

Accordingly, in one aspect, the invention consists in forming a channel between opposite overdrawn margins of upper material confronting the bottom of the insole of a lasted shoe by simultaneously trimming said margins in two planes intersecting the insole. Preferably, and in accordance with another aspect of the invention, the method herein disclosed provides for separating the margins from the insole to facilitate the trimming thereof and to guard against injury to the insole.

In another aspect a feature of the invention consists in an improved trimming machine comprising means constructed and arranged to trim simultaneously opposite overdrawn margins of upper material confronting the insole of a lasted shoe with parallel cuts in planes intersecting the insole.

The illustrated machine is provided with two (right and left) shearing couples arranged side by side, one member of each couple being formed and arranged to separate one of the overdrawn margins of upper material far enough from the insole to enable the other member of the couple to sever surplus material from the margin without striking the insole. The arrangement of the couples is such that the intermediate members thereof guide the shoe by engagement with the trimmed edges of the overdrawn margins, and thus guard against deviation of the trimming from side to side.

Referring to the drawing,

Fig. 1 is a front elevation of a trimming machine by which the method herein set forth may be practiced;

Fig. 2 is a right-hand elevation of the trimming elements thereof in the act of operating simultaneously on two opposite overdrawn margins of upper material lying on the insole of a lasted shoe;

Fig. 3 is a perspective view of a preferred form of the intermediate means of the trimming couples;

Fig. 4 is a horizontal section through the trimming elements as indicated by broken line IV—IV of Fig. 1; and Fig. 5 is a top-plan view of an inverted lasted shoe of which opposite overdrawn margins have been trimmed in accordance with the method herein set forth.

The lasted shoe shown in Figs. 2 and 5 comprises an upper 10, a lining 11, an insole 12, a counter-stiffener interposed between the lining and the upper, the heel-seat flange of the counter-stiffener being represented by dotted lines 14 (Fig. 5), lasting tacks 16 in the heel-seat portion of the shoe, lasting tacks 18 in the toe portion thereof and lasting staples 20 at opposite sides of the shoe. These elements are assembled on a last 22 according to methods commonly practiced in the manufacture of shoes of the types hereinbefore referred to. For the sake of brevity the upper 10, the lining 11 and the counter-stiffener are hereinafter referred to collectively as "upper material". The insole 12 has no rib or shoulder on its bottom surface. Consequently, when a margin 24 of upper material, after being pulled over and lasted on the insole, is secured to the insole by fasteners such as the tacks 16 and 18 and the staples 20, it lies in confronting relation to and in contact with the bottom face of the insole.

In Fig. 5 broken lines represent the inner edges of the opposite overdrawn margins of upper material in the shank portion of the shoe before said margins have been trimmed to provide a channel for the reception of a shank-stiffener, while the parallel unbroken lines 26 represent the trimmed edges of said margins. It will be observed that the planes of the trimmed edges 26 intersect the extremities of the heel-seat flange of the counter-stiffener and it is to be understood that in practicing the method herein set forth one or both of these extremities may be trimmed according to whether one or both project into the area to be cleared for the reception of a shank-stiffener.

The illustrated machine is designed to trim both overdrawn margins 24 simultaneously and progressively along parallel lines with cuts executed in planes that intersect the insole. The illustrated trimming mechanism includes two parallel outer blades or cutters 30, 30 provided with shearing edges 32, and intermediate cutting means provided with shearing edges 34, 34. The outer blades 30, 30 are arranged side by side in confronting relation to each other and their shearing edges are formed on their inner or confronting faces. Thus, the trimming means comprise right and left shearing couples 32, 34 arranged to execute parallel shearing cuts simultaneously.

As shown in Fig. 3 the right and left shearing edges 34 are formed respectively on two flat parallel blades 36, 36 which are spaced from each other by interposed shims 38 to regulate the width of the channel to be formed by the trimming cuts. Any desired number of shims, or shims of any desired aggregate thickness, may be interposed between the blades 36 in accordance with the requirements of the trimming operation to be performed. Registering holes are bored in the blades 36 and in the shims 38 to receive a pin 40, and other registering holes are likewise formed to receive a stud screw 42 by which these blades and shims are maintained securely in contact one with another to form, in effect, an intermediate cutting unit. The screw 42 extends also through the outer blades 30, 30 and through leaf springs 31, 31 by which the shearing edges of the blades 30, 30 are maintained in shearing relation to the shearing edges 34 of the intermediate unit. The screw 42 also serves as a pivotal connection between the outer blades 30, 30 and the intermediate unit, the outer blades being thus carried by the intermediate unit so as to be angularly movable relatively thereto. A nut 43 cooperates with the screw 42 to maintain the assemblage intact, while a shoulder 45 formed on the screw 42 prevents setting up the nut so tightly as to clamp the blades 30, 30 against the intermediate unit. Interchangeable screws 42 of different lengths may be substituted one for another when, for example, one or more shims 38 are added to the assemblage or removed therefrom, or when shims of greater or less thickness are substituted for those shown. This construction is such that the outer blades 30, 30 partake of the relative adjustment of the blades 36, 36 one toward or from the other.

The contour of the intermediate cutting unit, as shown in Figs. 1 and 3, is such as to provide a beak 44 extending horizontally. This beak has a relatively small vertical dimension and is arranged to run between the insole 12 of a lasted shoe and opposite overdrawn margins 24 of upper material lying thereon. Thus, when a lasted shoe is presented to the trimming means as shown in Fig. 2, the bottom surface of the beak 44 runs on the insole 12 while the shearing edges 34 of the beak run respectively under the overdrawn margins of the upper and thereby separate the margins temporarily from the insole so that they may be trimmed by the outer blades 30 without causing these blades to strike the insole. The curved surface 45 of the intermediate unit (Figs. 1 and 3) is formed and arranged to deflect the chips or trimmings of waste material upwardly as the trimming progresses.

Rectilinear horizontal reciprocations are imparted to the shearing couples to facilitate separating the margins 24 from the insole and to facilitate feeding the shoe. Accordingly, the intermediate unit comprising the blades 36 and the shims 38 is affixed to a carriage 46 arranged to slide in a straight horizontal slot 48 formed in the frame 50 of the machine. The pin 40 is affixed to the carriage 46 and projects beyond the intermediate unit to be engaged by an operating lever 52 connected to the frame 50 by a fulcrum member 54. The upper end of the lever 52 is provided with a slot 56 to receive a wrist-pin 58 projecting from an operating shaft 60 journaled in the frame 50. A continuously driven belt 62 runs on a pulley 64 affixed to the shaft 60 to operate the wrist-pin 58 and thereby impart positive and rapid reciprocations to the beak 44. The shearing edges 34 of the intermediate cutting unit extend approximately lengthwise of their lines of reciprocation but are inclined slightly with respect to said lines. In operation they gradually separate the overdrawn margins of the upper from the insole with repeated wedging actions and thereby diminish the manual effort required to feed a shoe past the trimming elements.

In the use of the illustrated machine, the operator places the insole of a lasted shoe against the bottom surface of the beak 44 so that as the shoe is fed endwise from right to left, the beak will run under the overdrawn margins 24 of the upper and will be reciprocated lengthwise of said margins. The operating mechanism has provision for reciprocating the outer blades 30, 30 up and down so that the shearing edges 32 thereof will pass back and forth across the shearing edges 34. As shown, the lever 52 is utilized to impart the described up-and-down movements to the outer blades 30 in a positive manner in addition to the horizontal reciprocations imparted positively thereby to the shearing couples. Accordingly, the cutting strokes and the horizontal movements of the blades are perfectly synchronized. To this end an arm 66 formed on the lever 52 is provided with a pin 68 which operates one arm of a bell-crank lever 70 connected to the frame 50 by a fulcrum member 72. The other arm of the lever 70 engages a pin 74 projecting from a vertically movable link 76 arranged to slide on a front face of the frame 50 and connected to the frame by a flanged block 78. This block is mortised into the slot 80 formed in the link 76. The lower end of the link 76 projects between the two outer blades 30, 30 and is provided with a horizontal pin 82 pressed tightly therein. Both ends of the pin 82 project beyond the link 76 and extend through horizontal slots 84 formed in the blades 30, 30 and through corresponding slots formed in the leaf spring 31, the extent of such projection being sufficient to provide for the maximum spacing of the shearing couples one from the other.

Although the outer blades 30, 30 partake of the horizontal reciprocations of the intermediate cutting unit while the link 76 has no corresponding movement, the articulated connection provided by the pin 82 and the slots 84 maintains the desired operating connection between the link and the blades 30.

The described operating mechanism causes the outer blades 30 to move downwardly while the shearing couples are moving from left to right, the shearing edges being thereby caused to sever the interposed materials during that portion of each cycle in which the shearing couples are advancing toward the uncut parts of the materials. As the cutting progresses step by step, the trimmed edges 26 (Fig. 5) closely embrace the parallel vertical surfaces of the beak 44 and thus guide the shoe in a straight line so that no special effort on the part of the operator is required to make the trimmed edges straight. Moreover, the described cutting mechanism insures parallelism of the trimmed edges 26 so that when once the effective width or thickness of the intermediate trimming unit has been regulated in accordance with the width of a shank-stiffener, the channel formed by the trimmed edges 26 cannot fail to be as wide as, but no wider than, the established distance between the shearing edges 34, 34.

Having thus described my invention, what I claim as new and desire to secure by Letters Patent of the United States is:

1. That improvement in methods of making shoes which consists in forming a channel between opposite overdrawn margins of upper material confronting the bottom of the insole of a lasted shoe by simultaneously trimming said margins in two planes intersecting the insole.

2. That improvement in methods of making shoes which consists in simultaneously separating opposite overdrawn margins of upper material from the bottom of the insole of a lasted shoe, and simultaneously trimming said margins in two planes intersecting the insole.

3. That improvement in methods of making shoes which consists in forming a channel between opposite overdrawn margins of upper material confronting the bottom of the insole of a lasted shoe by progressively trimming said margins simultaneously with parallel cuts in planes intersecting the insole.

4. That improvement in methods of making shoes, which consists in severing surplus material simultaneously from opposite overdrawn margins of upper material confronting the shank portion of the insole of a lasted shoe with cuts in planes intersecting the insole.

5. That improvement in methods of making shoes, which consists in severing surplus material simultaneously from opposite overdrawn margins of upper material confronting the insole of a lasted shoe with parallel cuts in planes intersecting the insole.

6. That improvement in methods of making shoes, which consists in forming a channel of uniform width on the bottom of a lasted shoe for the reception of a shank-stiffener by severing surplus material simultaneously from opposite overdrawn margins of the upper confronting the insole of the shoe with straight parallel cuts intersecting said margins in planes intersecting the insole.

7. That improvement in methods of making shoes, which consists in forming a channel of uniform width on the bottom of a lasted shoe for the reception of a shank-stiffener by shearing surplus material simultaneously from opposite overdrawn margins of upper material confronting the shank portion of the insole of the shoe.

8. That improvement in methods of making shoes, which consists in separating opposite overdrawn margins of upper material from the insole of a lasted shoe, and simultaneously and progressively trimming said margins.

9. That improvement in methods of making shoes which consists in simultaneously trimming opposite overdrawn margins of upper material confronting the insole of a lasted shoe with cuts in planes that intersect the body of the insole.

10. That improvement in methods of making shoes, which consists in progressively separating opposite overdrawn margins of upper material from the insole of a lasted shoe, and simultaneously and progressively shearing surplus material from said margins.

11. That improvement in methods of making shoes, which consists in simultaneously separating opposite overdrawn margins of upper material from the shank portion of the insole of a lasted shoe, and simultaneously trimming said margins along parallel lines.

12. That improvement in methods of making shoes, which consists in progressively separating opposite overdrawn margins of upper material from the shank portion of the insole of a lasted shoe, and simultaneously and progressively shearing surplus material from said margins along parallel lines.

13. A trimming machine comprising means constructed and arranged to trim simultaneously opposite overdrawn margins of upper material confronting the insole of a lasted shoe with parallel cuts in planes intersecting the insole.

14. A trimming machine comprising cutters arranged to operate respectively on opposite margins of upper material overlying the insole of a lasted shoe, means arranged to guide the shoe past said cutters, and means arranged to cause said cutters to sever said margins simultaneously with cuts in planes intersecting the insole.

15. A trimming machine comprising means arranged to guide a lasted shoe by engagement with a bottom surface thereof, and power-operated trimming mechanism constructed and arranged to trim simultaneously opposite overdrawn margins of upper material confronting the insole of the shoe with parallel cuts side by side and in planes intersecting the insole.

16. A trimming machine comprising means arranged to guide a lasted shoe by engagement with the bottom surface of the insole, and trimming mechanism constructed and arranged to sever surplus material simultaneously from opposite overdrawn margins of the upper confronting the insole with parallel cuts in planes intersecting the insole.

17. A trimming machine comprising work-guiding means formed and arranged to run between the insole of a lasted shoe and opposite overdrawn margins of upper material confronting the insole, and mechanism provided with two spaced cutters arranged to cooperate with said means to sever surplus material from said margins simultaneously.

18. A trimming machine comprising right and left shearing couples arranged side by side, the intermediate elements of said couples being formed and arranged to run between the insole of a lasted shoe and opposite overdrawn margins of upper material confronting the insole, and means arranged to operate the outer elements of said couples to sever surplus material from said margins.

19. A trimming machine comprising work-guiding means formed and arranged to run between the insole of a lasted shoe and opposite overdrawn margins of upper material confronting the insole, said means having two spaced shearing edges arranged to engage said margins simultaneously, and mechanism provided with two spaced shearing cutters arranged to cooperate respectively with said shearing edges to trim said margins.

20. A trimming machine comprising means formed and arranged to run between the insole of a lasted shoe and opposite overdrawn margins of upper material confronting the insole, said means having parallel outer faces provided with shearing edges to engage said margins respectively, and power-operated mechanism including two shearing members arranged to cooperate respectively with said shearing edges to trim said margins.

21. A trimming machine comprising two members formed and arranged to run side by side between the insole of a lasted shoe and opposite overdrawn margins of upper material confronting the insole, two trimming cutters arranged to cooperate with said members respectively to provide two trimming couples, said couples being relatively adjustable one toward and from the other, and mechanism arranged to operate said cutters to trim said margins simultaneously.

22. A trimming machine comprising two members formed and arranged to run side by side between the insole of a lasted shoe and opposite overdrawn margins of upper material confronting the insole, said members having shearing edges arranged to engage said margins simultaneously, two trimming cutters arranged to cooperate with said members respectively to provide two shearing couples, said couples being relatively adjustable one toward and from the other to regulate the distance between the shearing cuts, and mechanism arranged to operate said cutters to trim said margins simultaneously.

23. A trimming machine comprising a member formed and arranged to run between an article of work and a margin of sheet material lying thereon, said member having a shearing edge to engage said sheet material, mechanism arranged to reciprocate said member lengthwise of said margin to separate the margin from the article of work, a cutter carried by said member to partake of such reciprocation, said cutter being cooperatively related to said shearing edge, and mechanism arranged to operate said cutter to sever surplus material from said margin.

24. A trimming machine comprising means formed and arranged to run between an article of work and two opposite margins of sheet material lying thereon, said means having two shearing edges arranged to engage said margins respectively, mechanism arranged to reciprocate said means to separate the margins from the article, cutters carried by said means in cooperative relation to said shearing edges respectively, and mechanism arranged to operate said cutters to trim said margins.

25. A trimming machine comprising a reciprocatory member having a shearing edge, driven mechanism arranged to reciprocate said member approximately lengthwise of said edge, a cutter carried by said member in cooperative relation to said shearing edge, and driven means arranged to reciprocate said cutter across said shearing edge.

26. A trimming machine comprising a pair of cooperatively related shear members one of which is formed and arranged to run between the insole of a lasted shoe and a margin or upper material overlying the insole, mechanism arranged to reciprocate said shear members approximately lengthwise of said margin, and means arranged to reciprocate the other one of said members toward and from the insole.

27. A trimming machine comprising a reciprocatory member having a shearing edge, operating mechanism including a lever arranged to engage said member and reciprocate it approximately lengthwise of said edge, a cutter carried by said member in cooperating relation to said shearing edge, and mechanism operated by said lever to reciprocate said cutter across said shearing edge.

28. A shearing machine comprising a pair of cooperative shearing members, driven mechanism arranged to impart rapid reciprocations to said members relatively one to the other to cause successive shearing cuts, and driven mechanism arranged to impart rapid reciprocations to both of said members lengthwise of the cuts.

29. A shearing machine comprising a pair of cooperative shearing members, driven mechanism arranged to impart positive and rapid reciprocations to one of said members relatively to the other to cause successive shearing cuts, and driven mechanism arranged to reciprocate both of said members lengthwise of the cuts in synchronized relation to said rapid reciprocations.

30. A shearing machine comprising a pair of cooperative shearing members, a pivot member connecting said shearing members, driven mechanism arranged positively to oscillate said shearing members relatively one to the other about the axis of said pivot member to cause them to cut, and driven mechanism arranged to reciprocate both of said members positively in opposite directions lengthwise of the cut.

31. A shearing machine comprising a member formed and arranged to run between and engage two confronting elements of an article of work, mechanism arranged to reciprocate said member in right lines, said member having a shearing edge approximately parallel to said lines, a shearing cutter cooperatively related to said shearing edge, and mechanism arranged to reciprocate said cutter rapidly and positively in opposite directions across said shearing edge to sever one of said confronting elements.

In testimony whereof I have signed my name to this specification.

MICHAEL F. BROGAN.